Dec. 17, 1929.  A. WINTERKORN  1,739,703
AIRPLANE
Filed Sept. 25, 1928   2 Sheets-Sheet 1

INVENTOR.
Albert Winterkorn
BY
ATTORNEYS.

Dec. 17, 1929.          A. WINTERKORN          1,739,703
                           AIRPLANE
                     Filed Sept. 25, 1928       2 Sheets-Sheet 2
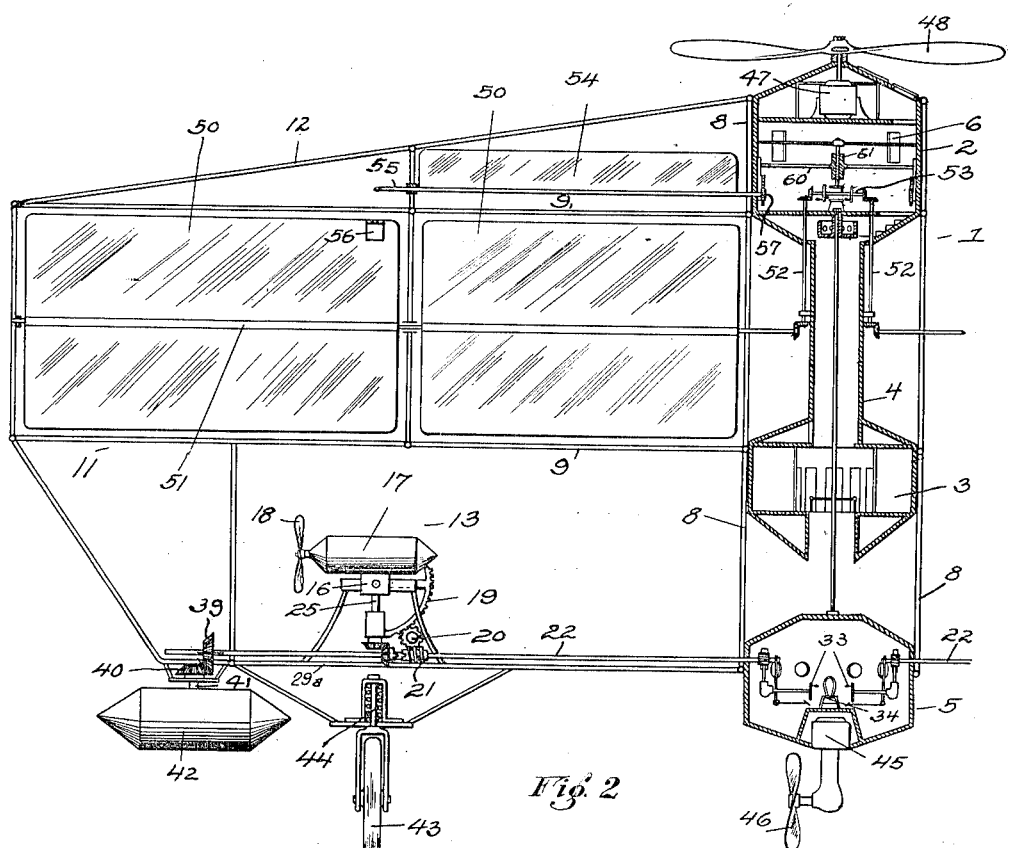
Fig. 2
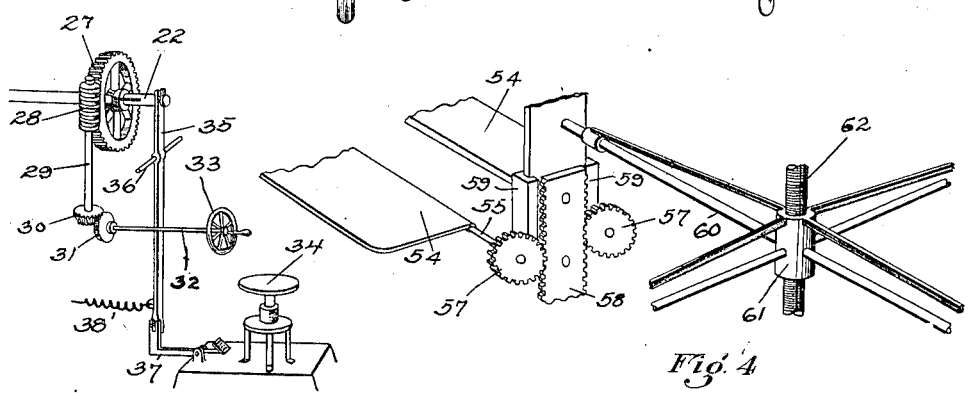
Fig. 3                                      Fig. 4
INVENTOR.
Albert Winterkorn
BY
W. S. McDowell
ATTORNEY.

Patented Dec. 17, 1929

1,739,703

UNITED STATES PATENT OFFICE

ALBERT WINTERKORN, OF COLUMBUS, OHIO

AIRPLANE

Application filed September 25, 1928. Serial No. 308,282.

This invention relates to improvements in motor-propelled air craft, and has for its primary object the provision of a heavier-than-air machine having helicopter principles of construction whereby improved control of the ascent and descent of the machine is secured.

It is another object of the invention to provide a novel type of aircraft provided with several operating propellers for effecting the controlled flight of the machine and wherein provision is made for shifting the operating position of such driving propellers and associated motors, while the machine is in flight, in order that the craft may be propelled in any desired direction from a given point of flight.

A further object of the invention resides in an air craft of strong and durable construction and which is formed to include a frame structure of substantially cross shaped formation, and to provide in the vertical axis of said frame structure a passenger containing body or fuselage, all of which parts constitute a unitary structure.

It is another object of the invention to provide each of the rigid frames which radiate from said body with an individual power plant, and to provide within said body controlling means, actuated at the will of the operators of the machine, for controlling the operating position of the power plant and its associated propeller, to the end that said power plant may rotate about compound vertical and horizontal axes, by which improved control of the direction of flight is afforded.

It is another object of the invention to provide each of the frames which radiate from the body or fuselage with pivoted major and minor wings, said major wings being turnable about normally horizontal axes so controlled that when the machine is moving forwardly in a general horizontal direction the major wings are moved to assume substantially horizontal planes of operation, by which sufficient wing surface is presented to the air to sustain and support the craft while in flight. Further, the controlling mechanism of the wing structure is such that when the machine is moving to a substantial extent vertically, the major wings assume vertical planes of operation, minimizing wind resistance and admitting of greater operating speed, provision being made for moving the secondary or minor wings for the purpose of causing the latter to assume operating positions or planes substantially at right angles to the major wings during ascent or descent of the machine.

The invention further provides a main horizontally arranged propeller at the upper end of the body or fuselage which is adapted to regulate the rise and fall of the machine when travelling vertically.

A still further object of the invention resides in constructing practically all of the principal parts of the plane from metal so that the latter will possess a very high degree of mechanical strength and yet will be sufficiently light in weight to permit of high speed flights.

With these and other objects in view which will appear as the description proceeds, the invention consists in the novel features of construction, combination of elements and arrangement of parts hereinafter to be fully described and pointed out in the appended claims.

In the accompanying drawings:

Figure 1 is a perspective view illustrating the improved air craft comprising the present invention, Figure 2 is a vertical sectional view taken through the body or fuselage of the air craft and disclosing one of the associated radiating frames and associated apparatus, Figure 3 is a perspective view disclosing the apparatus control for governing the operating positions by one of the main driving motors,

Figure 4 is a detailed perspective view disclosing the mechanism for controlling the operating positions of the secondary or minor wings, Figure 5 is a detail perspective view setting forth one of the power plants of the machine, Figure 6 is a detail sectional view of one of the adjustable motors, and

Figure 7 is a detail of the driving means for turning the adjustable motor.

Figure 1:
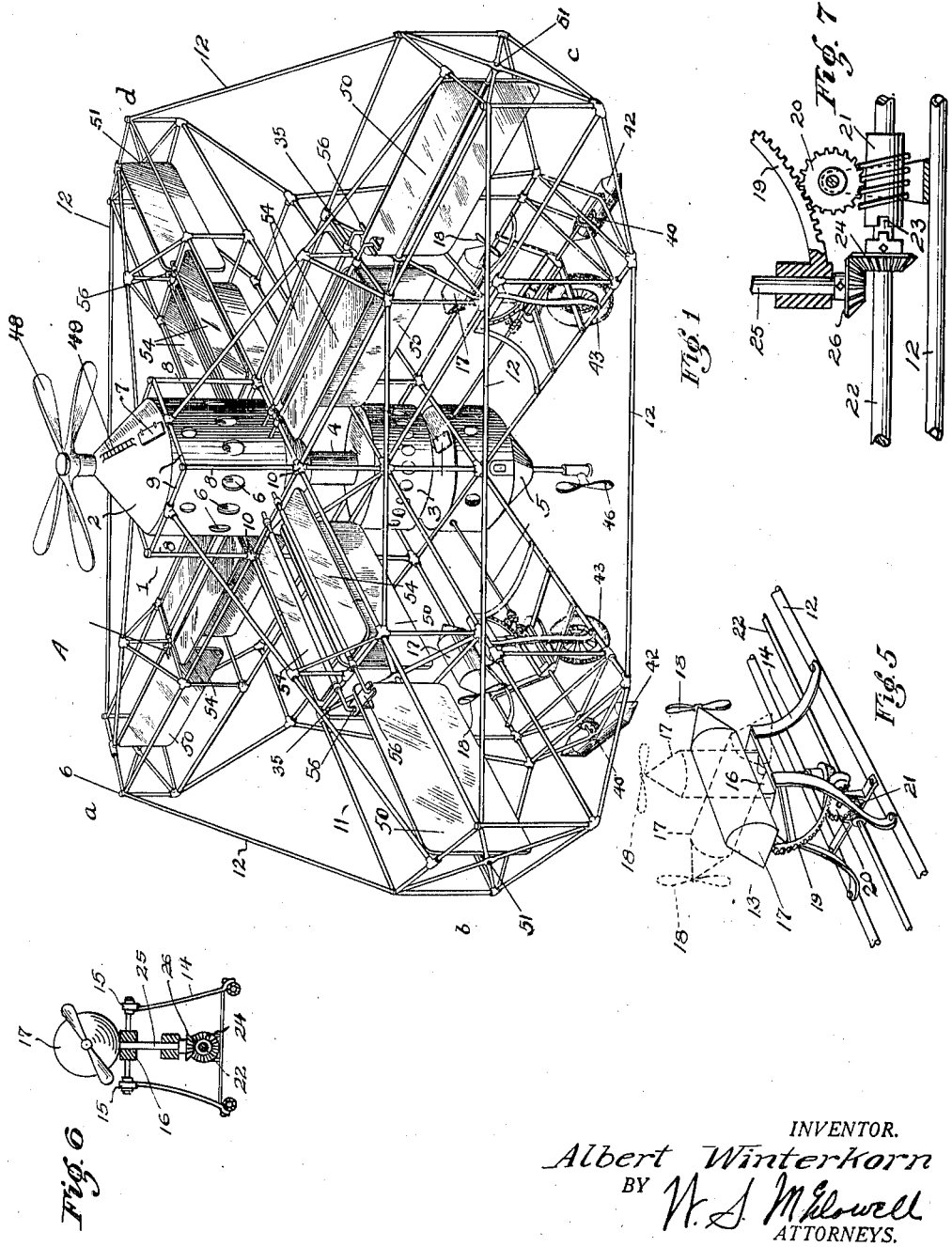

Referring more particularly to the drawings, the letter A indicates my improved aircraft in its entirety. Preferably, the latter is formed to comprise a vertically and centrally situated body 1, which may also be referred to hereinafter as the cabin or fuselage. This body usually includes an upper cylindrical section 2, which constitutes an observation section and in which is provided the controlling mechanism for governing the operating positions of the sustaining wings to be hereinafter described. Below the upper or observation section there is arranged what may be termed the cabin section 3, the latter being connected with the upper section 2 by means of a tubular elevator hoist 4. Below the cabin section 3 there is provided a circular control section 5, in which is mounted the controlling mechanism for governing the operating position of the principal driving motor, to be herinafter more fully described. The vertical hoistway 4 is adapted to communicate with each of the sections 2, 3 and 5 in order that the crew or operator of the craft may travel conveniently from one part of the machine to another. The sections 2, 3 and 5 are rigidly united and are preferably of strong metallic construction, being formed from aluminium or a suitable alloy throughout.

Windows or port openings 6 are provided in the walls of the sections 2, 3 and 5 to permit the operators to obtain a clear view of the vicinity surrounding the craft and to thereby effect proper control of its operation. The conical tops of the sections 2 and 5 are provided with trap-doors 7 by means of which access to the roofs of said compartments may be obtained.

Suitably connected with the body or fuselage of the machine is a frame structure composed preferably of tubular pipe sections formed from aluminium or an equivalent thereof. This frame structure provides a plurality of vertically extending sections 8, which lie closely adjacent to and parallel with the outer wall of the body 1. The vertical sections are united at intervals with horizontally and transversely extending sections 9, the latter being connected with the sections 8 by means of unions 10. This construction results in the formation of a substantially cubical frame, which extends vertically of the machine immediately adjacent to but surrounding the body 1, to which the said cubical frame is rigidly attached.

Connected with said cubical frame and radiating from the body 1 is a substantially cross shaped frame structure 11 which is formed to constitute four frame sections $a$, $b$, $c$ and $d$, each of which radiates horizontally from the vertical axis of the body 1. These frame sections are united with each other by means of angularly extending pipe sections 12, which connect said radiating sections at their outer ends to each other. The sections $a$, $b$, $c$ and $d$ are each suitably braced by longitudinal and transverse truss members and since such sections have their inner ends rigidly secured to the body 1 and its surrounding cubical frame structure and also by reason of the fact that the outer ends of the frame structure $a$, $b$, $c$ and $d$ are connected with each other by the angularly extending pipe sections 12, it follows that a frame of considerable strength and rigidity is provided which will meet the stresses and strains to which the machine is subjected in operation quite successfully, and yet at the same time an unusually light weight construction is produced.

For the purpose of governing the general movement of the craft, each of the frames $a$, $b$, $c$ and $d$ is provided with a power plant, designated in its entirety by the numeral 13. Since each of these power plants is of indentical construction a description of one will suffice for all. Arranged upon the lower part of each of the frames $a$, $b$, $c$ and $d$ is a stationary motor base 14. Pivotally mounted for turning movement about horizontally extending trunnions 15, connected with the upper portion of the base 14, is a motor platform 16, and upon this platform there is mounted a motor 17 of any suitable type, the shaft of said motor being adapted to drive a propeller 18. Formed with the platform 16 and rigidly depending from the underside thereof is an arcuate segment 19, which swings in unison with the platform 16 and the associated motor. This segment is adapted to mesh with a pinion 20, journaled in connection with the frame structure. This pinion in turn, is driven by a worm 21, which is mounted loosely about a longitudinally extending operating shaft 22. One end of the worm 21 is provided with a clutch face 23, which is adapted to engage with a corresponding clutch face provided on the hub of a beveled gear 24, which gear is fastened to the shaft 22. By moving the shaft 22 longitudinally the clutch face of the gear 24 may be meshed with the clutch face 23 so that the worm 21 may revolve in unison with the shaft 22. The rotation of the worm revolves the pinion 20, and since this pinion is in engagement with the teeth of the segment 19 it follows that the platform 16 and its associated motor 17 may be revolved about the horizontal axis provided by the trunnion 15. By this arrangement the motor 17 may be oscillated in a vertical plane. Then, to permit of the rotation of the motor about a vertical axis, the frame of said motor is provided with a depending shaft 25, which is journaled for rotation in bearings provided in the platform 16 and the associated segment frame 19. The lower end of this shaft 25 is provided with a beveled gear 26, which is adapted to mesh with the gear 24 when the latter is out of engagement with the worm 21. When in this last position it will be seen that by revolving the shaft 22 the motor may be turned about the axis of the shaft 25. Due to provision of this compound mounting for each motor unit the operating position of the propeller 18 may be governed at will.

For the purpose of controlling the operation of the motor from the body 1, the lower section 5, as shown in Figures 2 and 3, is provided with suitable operating mechanism by which the shafts 22 of the several motor units may be rotated simultaneously from a central position. To permit of this the inner end of each of the shafts 22 projects into the central section 5 of the body. The inner end of this shaft has keyed thereto a gear 27, which meshes with a worm 28, provided upon a vertically extending shaft 29. The bottom of the shaft 29 carries a beveled gear 30, which engages with a corresponding gear 31 provided upon one end of the horizontally extending shaft section 32, the outer end of the section 32 being equipped with a manipulating wheel 33, which is arranged adjacent to the operator's seat 34 within the cabin section 5. To govern the longitudinal shifting of the shaft 22, the inner end of the latter within the section 5 is formed with a groove in which is positioned the upper yoke shaped end of an arm 35. This arm is pivoted at 36 for oscillation about a horizontal axis. The lower end of said arm is pivotally connected with an L shaped foot pedal 37 adapted to be pressed by the operator's foot. It will be seen that when the pedal 37 is depressed the arm 35 will be oscillated about its pivotal part 36, thereby moving the associated shaft 22 outwardly and longitudinally. This movement disengages the gear 24 from the worm 21 and when continued moves the gear 24 into engagement with the gear 26 on the bottom of the vertical shaft 25. Then by rotating the wheel 33 the shaft may be revolved to turn the motor about its vertical axis. A spring 38 may be connected with the arm 35 for the purpose of maintaining the gear 24 normally in contact with the clutch face 23. By virtue of this construction from a central position the direction in which the propellers 18 operate may be governed at will. For example, when the machine is moving upwardly the propellers 18 may be turned so that they operate in a substantially horizontal plane and when the machine is going forwardly the propellers may be turned so that they revolve in substantially vertical planes.

The outer ends of the shafts 22 are equipped with splined gears 39 which engage with horizontally disposed gears 40 carried by the shafts 41 of floats or pontoons 42. These floats or pontoons turn in unison with the motor 17 and are used when the machine alights upon the surface of a body of water. By turning with the motor 22 the pontoons are always in position to accord with the direction of movement of the machine which is effected by the operation of the propellers 18.

Depending from the frames $a$, $b$, $c$ and $d$ are ground engaging wheels 43, which are adapted to turn about a vertical axis 44. These wheels may be provided with the usual inflated rubber tires by which movement of the machine on land is facilitated.

The bottom of the control section 5 is also provided with a motor 45 which governs the operation of a propeller 46. The motor and propeller turn about a vertical axis passing through the center of the motor 45 so that the propeller 46 may be presented to such operating positions as to secure the desired direction of movement when the machine rests upon a body of water and it is desired to effect its propulsion. Preferably, the propeller 46 is adjustable vertically so that it will be above the plane of the lower portion of the wheels 43 when the machine is on the ground, whereas when the machine alights on the surface of a body of water the propeller 46 may be lowered below the wheels 43 and the floats or pontoons 42 to enable such propeller 46 to operate most efficiently.

The upper or observation section 2 is provided in the top thereof with a motor 47, which drives a horizontally disposed propeller 48, arranged exteriorly above the top of the section 2. The propeller 48 is utilized for the purpose of imparting power to the machine when it is in vertical ascent or descent after the manner of a helicopter. The top of the section 2 above the trapdoor 7 is provided with a ladder 49 by which access to the propeller 48 may be conveniently effected.

Arranged within each of the sections $a$, $b$, $c$ and $d$ is a wing mechanism, which is of the same construction in all of said sections. This wing mechanism for each section comprises a pair of major wings 50 which are centrally pivoted to turn about substantially horizontal axes 51. When the machine is moving forwardly the wings 50 are in a substantially horizontal position and present sufficient surface to sustain the flight of the machine. When the machine is moving vertically the wings 50 are rotated to assume substantially vertical positions, as shown in Figure 1. This is accomplished by providing the shafts 51 at their inner ends with gears, which mesh with corresponding gears provided on the lower ends of vertically journaled shafts 52, the upper ends of these shafts extending into the observation section 2. The extreme upper ends of the shafts 52 are provided with gears which mesh with corresponding gears mounted upon short control shafts 53. By rotating the shafts 53 uniform and corresponding movement may be imparted to all of the wings 50 in the various frame sections of the machine. Above the wings 50 in each frame section there is arranged a pair of relatively smaller auxiliary or secondary wings 54, which are also mounted to turn about horizontally extending shafts 55 which are journaled in connection with said frame sections. Preferably the wings 54 occupy at all times positions substantially perpendicular to those occupied by the main wings 50. Thus when the machine is moving vertically, as shown in Figure 1, the auxiliary wings 54 are substantially horizontal and the wings 50 vertical, whereas in forward flight the wings 50 are horizontal and the auxiliary wings 54 are substantially vertical. To maintain the wings 50 vertical when the wings 54 are horizontal, the outer ends of the shafts 55 are angularly bent and are adapted to be received within sockets provided in brackets 56 which are rigidly carried by the outer wings 50. This construction produces an interlock maintaining the desired relative position of the wings.

To control the positions of the auxiliary wings 54, the inner ends of the shafts 55 extend into the section 2 and are provided with pinions 57. These pinions are engaged by a sliding rack 58, which is carried by stationary guides 59 arranged in connection with the inner walls of the section 2. The upper ends of the racks 58 are united by means of a frame 60, the hub 61 of which being threaded for the reception of a vertical screw 62. By rotating the screw 62 the frame 60 is moved vertically, moving in unison therewith the racks 58 and this movement is utilized to rotate the pinions 57 and the auxiliary wings 54.

In operation, when either ascension or descension is desired the wings or planes 50 are turned to assume vertical positions, while the auxiliary wings or planes 54 are turned in an almost horizontal position, which positions assure positive direction and control of the machine. When the wings 50 are in said vertical position the interlock provided by the socket 56 prevents said wings 50 from vibrating or turning during ascension or descension. This vertical movement of the air craft is also assisted by the four main motors 17, one being located on each of the frame sections $a$, $b$, $c$ and $d$. It will be observed that each motor 17 is capable of being turned in any horizontal direction or being turned in a vertical direction, the movement thereof being governed from a central control position. The various sections of the body 1 are in communication by means of the central elevator shaft and by means of telephone communication so that the machine operators in these different sections may readily co-ordinate the control of the machine. When the plane has reached the desired altitude, the operator in the upper compartment 2 gradually turns the planes 50 to a horizontal position; the operator in the lower compartment 5 turns the four motors 17 to a horizontal position and in the desired direction, and the entire plane moves in that direction. Under certain circumstances the motor driving the main propeller 48 may be slowed down, but it is advisable to keep this propeller in operation while the machine is in flight, thus assisting in keeping the plane aloft and allowing it to move at a desired rate of speed, either slow or fast. If the entire plane is to be brought to a standstill in the air, the wings 50 and 54 are left in the horizontal position and the motor driven propeller 48 has its speed increased to keep the plane aloft. This permits the air craft to be employed for observation purposes and renders it particularly suitable for use in Army and Navy operations. When the plane is employed in such observation capacities the motors 17 and the associated propellers 18 are turned toward the body 1 so that the propellers 18 are all faced inwardly. This forces a column of air upwardly and vertically of the body 1 and assists the horizontal propeller 48 in maintaining the machine in suspended flight. In case assistance is needed to maintain such suspended flight the four motors 17 on the wing structures may be turned in a semivertical direction and kept at a required speed sufficient to assist in keeping the plane aloft and to maintain its equilibrium.

In the case of alighting upon land, the machine is equipped with the inflated tires on the wheels 43, which are of the castor type. If the machine descends upon the surface of a body of water the floats or pontoons are employed to assist in maintaining the buoyancy thereof and the bottom propeller 46 is actuated to propel the craft through the water, assisted perhaps by the motors and propellers 17 and 18.

In view of the foregoing it will be seen that the present invention provides an air craft of the helicopter type, adapted for flight in any desired direction and wherein safety is secured by the employment of the several independently operating motor driven propellers. As stated, the machine may be usefully employed in operations incident to warfare, although, of course, it is equally as well adapted for civil pursuits.

While I have described what I consider to be the preferred form of the invention and have set forth in detail the construction and operation of a single specific embodiment thereof, yet it is to be understood that the invention is not to be limited in scope by such description but that I reserve the right to employ all such variations and modifications that may be apparent to those skilled in the art and which may be said to fall properly within the scope of the following claims.

What is claimed is:

1. In an airplane, a centrally and vertically situated body, a substantially cross shaped frame structure secured to and extending horizontally from said body, each of the sections of said frame structure being provided with pivotally movable wings capable of assuming horizontal or vertical positions, a motor mounted upon each of said sections, and a propeller driven by each of said motors.

2. In an airplane, a centrally disposed body, a substantially cross shaped frame structure projecting rigidly and horizontally from said body, major and minor wings adjustably carried by each of the sections of said frame structure, and a motor driven propeller carried by each of the frame sections.

3. In an airplane, a centrally disposed body, a substantially cross shaped frame structure secured to and radiating horizontally from said body, wings rotatable about horizontal axes and carried by each of the sections of said frame structure, means arranged within said body admitting of the adjustment of said wings, and a motor driven propeller carried by each of the sections of said frame structure.

4. In an airplane, a centrally disposed body, a substantially cross shaped frame structure secured to and radiating horizontally from said body, major and minor wings carried by each of the sections on said frame structure, means disposed within said body admitting of the adjustment of said wings, a motor driven propeller carried by each of the sections of said frame structure, and a horizontally disposed propeller carried by and arranged above said body.

5. In an airplane, a substantially centrally and vertically situated body, a cross shaped frame structure secured to and extending horizontally from said body, major and minor wing members carried by each of the sections of said frame structure, independently operating means for rotating said wings about substantially horizontal axes, interlocking means between said wings for maintaining the major wings in a vertical position while the minor wings are horizontally positioned, and motor driven propellers carried in conjunction with said frame structure.

6. In an airplane, in combination, a vertically and centrally situated body, a substantially cross shaped frame structure secured to and extending horizontally from said body, wings carried by said frame structure, a plurality of motors mounted upon said frame structure independently of said wings, propellers driven by said motors, and a mounting for each of said motors permitting said motors to be turned bodily about horizontal and vertical axes.

7. In an airplane, a centrally and vertically situated body, a frame structure extending rigidly and horizontally from said body, wings carried by said frame structure, motors carried by said frame structure independently of said wings, propellers driven by said motor, a base for each of said motors mounted upon said frame structure, by means controlled from said body admitting of the turning of each of said motors and the base of each thereof about vertical and horizontal axes.

8. In an airplane, a centrally and vertically extending body, a frame structure of substantially cross formation extending rigidly and horizontally from said body, wings carried by said frame structure, motor driven propellers carried by said frame structure independently of said wings, a horizontally arranged propeller carried by the upper end of said body, a motor for said last named propeller, and a water engaging propeller carried by the lower end of said body.

9. In an airplane, in combination, a vertically and centrally situated body, a substantially cross-shaped frame structure secured to and extending horizontally from said body, wings carried by said frame structure, a motor mounted on each of the sections of said frame structure, propellers driven by said motor, an operating shaft extending from said body to each of said motors for swinging the latter bodily on a mounting about horizontal and vertical axes, a pontoon positioned under each of said frame sections and mounted thereon for horizontal swinging movement, and means connecting said pontoons with said operating shaft whereby upon the rotation of the shaft to turn the motors for horizontal swinging movement, said pontoons will be swung in a direction to a position in accord with the longitudinal axes of said motors.

10. In an airplane, in combination, a vertically and centrally situated body, a substantially cross-shaped frame structure secured to and extending horizontally from said body, wings carried by said frame structure, a motor mounted for horizontal swinging movement on each of the sections comprising said frame structure, propellers driven by said motors, operating shafts for controlling the swinging movement of said motors extending from said body, means for rotating said shafts, a pontoon mounted for horizontal swinging movement under each of said frame sections and arranged near the outer ends thereof, and gears connecting said shafts with said pontoons, whereby the pontoons and the motors may at all times be positioned parallel to each other.

11. In an airplane, in combination, a centrally situated body, a cross-shaped frame structure secured to and extending horizontally from said body, wings carried by said frame structure, a motor mounted for horizontal and vertical swinging movement on each of the sections of said frame structure, propellers driven by said motors, shafts extending horizontally of said frame sections and having one of their ends positioned within said body and the other end terminating substantially at the outer end of said frame section, means situated within said body for controlling the rotation of said shafts, a clutch on each of said shafts, and means formed with the inner ends of said shafts for sliding the shaft longitudinally whereby said clutches may be engaged and disengaged for controlling the vertical and horizontal swinging movement of said motors.

12. In an airplane, a substantially centrally and vertically situated body, a cross-shaped frame structure secured to and extending horizontally from said body, major and minor wing members carried by each of the sections of said frame structure, means arranged within said body admitting of adjustment of said major wings simultaneously, and separate means arranged within said body for adjusting the minor wings simultaneously, and a motor driven propeller carried by each of the sections of said frame structure.

13. In an airplane, a centrally disposed body, said body comprising upper and lower compartments, a substantially cross-shaped frame structure secured to and radiating horizontally from said body, wings rotatable about horizontal axes and carried by each of the sections of said frame structure, a motor driven propeller carried by each of the sections of said frame structure, means arranged within said upper body section for admitting of the adjustment of said wings, and means positioned within the lower body section for controlling the operation of said motors.

ALBERT WINTERKORN.